UNITED STATES PATENT OFFICE.

CHRISTOPHER CORY, OF LIMA, INDIANA.

IMPROVED MODE OF PREVENTING THE POTATO-ROT.

Specification forming part of Letters Patent No. 43,292, dated June 28, 1864.

*To all whom it may concern:*

Be it known that I, CHRISTOPHER CORY, of Lima, in the county of La Grange and State of Indiana, have invented new and efficient Methods of Retarding, Counteracting, and Remedying the Potato Disease; and I do hereby declare that the following is a full, clear, and exact description thereof.

The nature of my invention consists in counteracting, mitigating, and remedying the potato disease known as the "potato-rot," and also in counteracting and retarding its progress.

The potato-rot, as is most clearly demonstrated by many observations and experiments continued through a succession of near seventeen years, is occasioned primarily by insects and animalcules; and, secondly, it is enlarged and still further propagated by its own infective influences when existing in circumstances favorable for the decay of vegetable matter. As to the primary causes—*i. e.*, insects and animalcules, these operate on the leaves, vines, and the roots, and especially on and within the tubers themselves. They are extensively planted with the seed potato, being within it, and are grown and perpetuated with the potato crop. Hence the more diseased the seed potato the more diseased the potato crop, other things being equal. Soil, climate, and seasons have much to do to increase or retard said disease. A clay soil, from its being compact and moist, favors the increase of the animalcules themselves, and also prevents the desirable escape of the deranged fluids and gases of the diseased potato. So, also, a hot, sultry, wet period, after the animalcules are collected inside of the tubers, is favorable for their rapid increase in number and in efficiency. The wounds also inflicted by them in this wet, hot, sultry period become, by reason of the extra confinement, moisture, and heat, more corrupt and infective. Hence the greater prevalence of the disease at different times and in different seasons. Potatoes closely confined in large quantities and in warm, moist, sultry localities, if but moderately affected at first, can hardly escape complete destruction if they are long continued in said condition. The primary causes will multiply in numbers vastly and the work of destruction will progress with a rapidity known only to this particular malady.

It is thought by some who admit the existence of insects and animalcules in diseased potatoes that they are consequents rather than causes of said disease; but it is evident from repeated observations that the first symptoms of this disease in the tubers are found in the form of small punctures in spots on the surface, while in all other respects the potato has a healthy appearance. These spots, under favorable circumstances for the increase of the disease, are found also to deepen and widen, and ultimately to corrupt and throw out tainted effluvia, and otherwise give unmistakable evidence of the regular progress of this noted potato disease, and yet in the meantime the other parts and portions of the potato may present a healthy appearance. For this local affection there must be some efficient local cause. If the cause producing these local effects be in the vine or root or nature of the potato, or in the sickliness of the vine or tubers, or both, or if it be in the degeneracy of the plant, then why is this malady local, and not spread equally alike over the whole potato? On the other hand, these affected parts often give other corresponding proofs of much importance in the case. The said punctures are often followed by still other signs of living agencies, such as additional perforations, refuse matter, and numerous sloughed-off coverings of the insects themselves. Besides, these insects, notwithstanding all the difficulty of their visibility from their minuteness, color, and concealment, have been and may still be seen in sufficient number to convict them of the depredations so strongly suspected by these facts just enumerated. They, with their associates or their ancestors, perforated the potato. They caused the festering and infectious wounds. They put into active operation this whole work of destruction so bitterly complained of throughout our land. These identical depredators may often be brought from their concealment and made to pass in full view before the eye, assisted by suitable optics. My own first discovery was in the season of 1847.

My potatoes, grown on a rich prairie soil, were found badly infected with the true, genuine potato-rot. In harvesting them the potatoes were taken from the hill and left scattered on the ground to dry. On the occasion referred to the middle of the day was warm and pleasant and the after part suddenly chilly. In gathering these potatoes in the cool of the day numerous light specks, strongly contrasting with the dark potato and earth, were found on them, and especially in and around their affected parts, which, when submitted to close inspection under a magnifying-glass, were found to be animalcules of the maggot form. From their position and all the attending circumstances there could be no doubt but they were from the wounds of the diseased potatoes, and they were in sufficient numbers to induce the belief that they had caused these said wounds, from which they had been incautiously attracted by the light and heat of the sun. The sudden chill, which amounted to nearly a frost, had prevented their timely return to their feeding-ground and hiding-place. From this starting-point I have made numerous other experiments and observations equally successful and conclusive. In the course of these experiments I have taken occasion to elicit these animalcules and other insects from diseased potatoes and to give limited exhibitions of them to some of the *literati* of our country, including Professor Henry, of the Smithsonian Institute; Marshel P. Wilder, then president of the United States Agricultural Society; Professor Harris, of Cambridge University, and others. Some of these insects shown to the gentleman last named were pronounced by him to be of the aphis species. On another occasion, while exhibiting these insects to the president and several of the professors of the New York State Normal Institute at Albany, one of the said insects brought forth its living offspring while under the microscopic inspection of the president. This was in the spring of 1856. The potatoes thus inspected were gathered but a few minutes before from one of the vegetable stores of that city, and gave all the usual signs of the potato-rot, together with a full supply of these primary agents in attendance and ready to perfect the work of destruction hitherto so successfully commenced and prosecuted by them.

In the course of my experiments I have examined diseased potatoes grown in the Eastern, Middle, Western, and Southern States, and also in England, and find that the general appearances of this disease are the same irrespective of the locality of the growth of the potato. Those grown on the English soil and brought over in one of their steam-packets were no less charged with numerous living insects. The wounds inflicted and occupied by them were of the same appearance and gave the same, usual, unmistakable signs of their living origin.

The method that I have usually adopted of alluring these insects from their concealment is to place the diseased portion of the potato in the full light and heat of the sun some fifteen minutes or more. I then examine the surface of the wound in the full light of the sun with a glass having strong magnifying powers. In this way they can usually be detected by a skillful operator, notwithstanding their minuteness, their sameness of color with the potato, and their usual concealment below its surface.

The central cavity sometimes noticed in large potatoes probably does not belong to the potato disease properly, but may be rather owing to their more vigorous and rapid growth. The dark spots and streaks also in some diseased potatoes lying back and still deeper in than the punctures and wounds hitherto spoken of may proceed either from the extended movement of the animalcules into those parts, or they may be occasioned by the infecting influences of the deranged fluids and gases from the adjacent affected parts of said potatoes. Either might be a sufficient cause for these defects. Writers on the subject have also noticed numerous fungi in connection with the potato-rot. Some have attributed the rot to the fungi. But then what produced the fungi that produced the rot? This fungus existence, both on the vines and on the tubers, seems easily accounted for as a natural derangement of the sap or fluid by reason of small and numerous punctures by these insects already referred to, causing the outflowing of the juice or sap and its appropriation to this very species of work. Of the dry potato-rot I have seen but little written explanatory of its phenomenon. Most have considered it a strange work indeed, and yet, when rightly understood, the process of operation and the result are equally simple and natural. These potatoes in the more early stages of their disease sometimes become moist, as from perspiration, and at other times they are known to weep great tear-drops. The causes are internal. This perspiration and this weeping of large tears are produced by the changing of positions by the within insects. The large drops are thrown out by these insects passing from the lower portions of the perforated potato toward the surface, and thus carrying with them the dislodged fluid intercepting their pathway. Let this be often repeated and in different parts of the potato, as has been frequently seen, and let the other usual process of drying the fluid of the potato be continued, and soon the dry-rot will be most fully developed.

In relation to the branch of the potato disease as exhibited in the deadened spots on the leaves and in the withering and drying of the vines, it may all be disposed of in few words and on the same principles as above presented. These affected leaves have been punctured, and their sap—*i. e.*, life-blood—eaten up or suffered to flow away. And so of the blasted vines. They have been girdled probably near the roots, or otherwise mortally wounded, and that, too, by the very identical living agents and their offspring which were planted with and nourished by the parent seedling. These destroying agents, during the wet, hot, sultry period often referred to by the disappointed husbandmen, in which their potatoes perished by the acre together, multiplied by the thousand and tens of thousands, and went forth armed and nerved for this very work of destruction. That it is these "little foxes that destroy the vines," as well as the tubers, every careful observer with good eyes and good magnifying-glasses may have satisfactory occular demonstrations.

In view of these defining and explanatory remarks, two things will appear most obvious: first, that these destructive agents should be as far as practicable dispersed, neutralized, or destroyed; and, secondly, that the dislodged fluids and gases from the diseased potatoes should be removed or counteracted. Hence the following outline: The insects and animalcules are of course mostly unmanageable after the seedlings containing them are planted and the warm sultry season has advanced. Again, this disease is met more directly and efficiently by putting the tubers containing the living animalcules and insects into close bins, as near air-tight as may be, or in other deposits suitably arranged, and then with the air-pump or any other suitable implement or way let the air be exhausted to the extent of extinguishing the life of said insects. The same end may be accomplished by a partial removal of the atmosphere and then inserting gases, vapors, &c., destructive of animal life; or the same end may be attained without removing the atmosphere by passing into and retaining among the potatoes for a sufficient time sulphurous fumes or other poisonous gases or destructive agents; or, in place of any or all of these, electricity, by any of its appropriate methods, may be employed. The grand object is to neutralize or destroy said depredators by whatever process or instrumentality may be found adapted or adequate to the work.

Partially-diseased potatoes may also be still further relieved by passing cool or other currents of air, gases, or vapors, or cleansing agents over and around them to remove the disengaged gases and fluid incident to the potato-rot.

With the destruction of the above-named active living causes, and with the removal of the dislodged fluids and poisonous gases, the potato disease will stay its progress and the remaining unaffected portions of them will be found suitable for ordinary purposes.

I am aware that in the course of the last twenty years, in which the potato disease has been so prevalent, there have been many remedies suggested and expedients tried, both in this and foreign countries, of which some have been in the right direction, though without defining or apparently knowing the nature or causes of the disease or why said treatment was beneficial. I do not therefore claim broadly these beneficial expedients and suggestions; but I do claim—

The invention of counteracting and remedying in the tubers themselves the potato-rot as a specific disease, caused primarily by insects and animalcules, and, secondarily, by the infectious fluid and gases of the potatoes thus affected, by the direct destruction of the former and by the timely regulation or removal of the latter, substantially as herein set forth.

CHRISTOPHER CORY.

Witnesses:
HALLET KILBOURN,
WM. MITTULE.